US008814651B1

(12) United States Patent
Humphrey et al.

(10) Patent No.: US 8,814,651 B1

(45) Date of Patent: Aug. 26, 2014

(54) GAMING SYSTEM AND METHOD PROVIDING A KENO GAME IN WHICH NUMBERS CAN BE SELECTED MORE THAN ONCE

(71) Applicant: IGT, Reno, NV (US)

(72) Inventors: Thomas J. Humphrey, Reno, NV (US); James M. Cole, Reno, NV (US); Bradford D. Brown, Sparks, NV (US); Ross D. Wenker, Reno, NV (US); Benjamin R. Holsclaw, Sparks, NV (US); Robert W. Ruymann, Reno, NV (US)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 13/787,626

(22) Filed: Mar. 6, 2013

(51) Int. Cl.
*A63F 13/00* (2014.01)
*G07F 17/32* (2006.01)

(52) U.S. Cl.
CPC .......... *G07F 17/326* (2013.01); *G07F 17/3267* (2013.01)
USPC .................................. 463/17; 463/18; 463/19

(58) Field of Classification Search
USPC ........................................ 463/10, 1, 2, 16–22
See application file for complete search history.

(56) References Cited

U.S. PATENT DOCUMENTS

| | | | |
|---|---|---|---|
| 4,033,588 A | | 7/1977 | Watts et al. |
| 4,611,811 A | | 9/1986 | Haase et al. |
| 4,661,906 A | | 4/1987 | Difrancesco et al. |
| 4,711,454 A | | 12/1987 | Small |
| 4,747,600 A | | 5/1988 | Richardson et al. |
| 4,775,155 A | | 10/1988 | Lees |
| 4,798,387 A | | 1/1989 | Richardson |
| 4,875,686 A | | 10/1989 | Timms |
| 5,005,840 A | | 4/1991 | Schwartz et al. |
| 5,043,887 A | | 8/1991 | Richardson et al. |
| 5,046,737 A | | 9/1991 | Fienberg |
| 5,072,381 A | | 12/1991 | Richardson et al. |
| 5,116,049 A | | 5/1992 | Sludikoff |
| 5,158,293 A | | 10/1992 | Mullins |
| 5,242,163 A | | 9/1993 | Fulton et al. |
| 5,351,970 A | | 10/1994 | Fioreti et al. |
| 5,401,024 A | * | 3/1995 | Simunek ......................... 463/18 |

(Continued)

FOREIGN PATENT DOCUMENTS

| | | |
|---|---|---|
| EP | 1 513 116 | 3/2005 |
| WO | WO 2004/014502 | 2/2004 |

(Continued)

*Primary Examiner* — Damon Pierce
*Assistant Examiner* — Jeffrey Wong
(74) *Attorney, Agent, or Firm* — Neal, Gerber & Eisenberg LLP

(57) ABSTRACT

The present disclosure is directed to a gaming system and method providing a game in which symbols can be selected more than once. In one embodiment, the gaming system initiates a play of the game, displays a plurality of different symbols, and receives a selection of at least one of the symbols to form a player symbol set. The gaming system randomly selects a designated quantity of the symbols to form a gaming system symbol set. Each of the symbols can be selected more than once. The gaming system determines any awards based on a comparison of the player symbol set with the gaming system symbol set, and provides any determined awards. If an additional award opportunity triggering event associated with the gaming system symbol set including a plurality of instances of a same one of the symbols occurs, the gaming system provides an additional award opportunity.

20 Claims, 9 Drawing Sheets

(56) References Cited

U.S. PATENT DOCUMENTS

| | | | | |
|---|---|---|---|---|
| 5,419,592 | A | 5/1995 | Stuart et al. | |
| 5,482,289 | A | 1/1996 | Weingardt et al. | |
| 5,569,083 | A | 10/1996 | Fioretti et al. | |
| 5,586,937 | A | 12/1996 | Menashe | |
| 5,628,684 | A | 5/1997 | Bouedec et al. | |
| 5,639,089 | A | 6/1997 | Matsumoto et al. | |
| 5,647,798 | A | 7/1997 | Falciglia | |
| 5,651,735 | A | 7/1997 | Baba | |
| 5,679,077 | A | 10/1997 | Pocock et al. | |
| 5,687,971 | A | 11/1997 | Khaladkar | |
| 5,718,631 | A | 2/1998 | Invencion et al. | |
| 5,727,786 | A | 3/1998 | Weingardt et al. | |
| 5,743,526 | A | 4/1998 | Inoue | |
| 5,755,619 | A | 5/1998 | Matsumoto et al. | |
| 5,779,545 | A | 7/1998 | Berg et al. | |
| 5,800,269 | A | 9/1998 | Holch et al. | |
| 5,823,534 | A | 10/1998 | Banyai et al. | |
| 5,848,932 | A * | 12/1998 | Adams | 463/20 |
| 5,857,911 | A | 1/1999 | Fioretti et al. | |
| 5,871,398 | A | 2/1999 | Schneier et al. | |
| 5,909,875 | A | 6/1999 | Weingardt et al. | |
| 5,935,001 | A | 8/1999 | Baba et al. | |
| 5,935,002 | A | 8/1999 | Falciglia | |
| 5,945,655 | A | 8/1999 | Gilgeous et al. | |
| 6,015,346 | A | 1/2000 | Bennett | |
| 6,017,032 | A | 1/2000 | Grippo et al. | |
| 6,024,640 | A | 2/2000 | Walker et al. | |
| 6,033,306 | A | 3/2000 | De Souza et al. | |
| 6,079,711 | A | 6/2000 | Wei et al. | |
| 6,089,976 | A * | 7/2000 | Schneider et al. | 463/16 |
| 6,089,978 | A * | 7/2000 | Adams | 463/20 |
| 6,099,407 | A | 8/2000 | Parker et al. | |
| 6,102,400 | A | 8/2000 | Scott et al. | |
| 6,146,272 | A | 11/2000 | Walker et al. | |
| 6,168,521 | B1 | 1/2001 | Luciano et al. | |
| 6,174,235 | B1 | 1/2001 | Walker et al. | |
| 6,183,361 | B1 | 2/2001 | Cummings et al. | |
| 6,186,892 | B1 | 2/2001 | Frank | |
| 6,210,276 | B1 | 4/2001 | Mullins | |
| 6,210,279 | B1 | 4/2001 | Dickinson | |
| 6,220,961 | B1 | 4/2001 | Keane et al. | |
| 6,241,606 | B1 | 6/2001 | Riendeau et al. | |
| 6,250,685 | B1 | 6/2001 | Walker et al. | |
| 6,257,980 | B1 | 7/2001 | Santini, Jr. | |
| 6,280,325 | B1 | 8/2001 | Fisk | |
| 6,283,855 | B1 | 9/2001 | Bingham | |
| 6,309,298 | B1 | 10/2001 | Gerow | |
| 6,309,300 | B1 | 10/2001 | Glavich | |
| 6,315,290 | B1 | 11/2001 | Roethel | |
| 6,315,291 | B1 | 11/2001 | Moody | |
| 6,325,716 | B1 | 12/2001 | Walker et al. | |
| 6,336,862 | B1 | 1/2002 | Byrne | |
| 6,346,043 | B1 | 2/2002 | Colin et al. | |
| 6,358,151 | B1 | 3/2002 | Enzminger et al. | |
| 6,364,313 | B1 | 4/2002 | Moody | |
| 6,364,767 | B1 | 4/2002 | Brossard et al. | |
| 6,368,213 | B1 | 4/2002 | McNabola | |
| 6,368,214 | B1 | 4/2002 | Luciano | |
| 6,368,218 | B2 | 4/2002 | Angell, Jr. | |
| 6,398,644 | B1 | 6/2002 | Perrie et al. | |
| 6,398,645 | B1 | 6/2002 | Yoseloff | |
| 6,398,646 | B1 | 6/2002 | Wei et al. | |
| 6,402,614 | B1 | 6/2002 | Schneier et al. | |
| 6,419,583 | B1 | 7/2002 | Crumby et al. | |
| 6,425,823 | B1 | 7/2002 | Byrne | |
| 6,454,648 | B1 | 9/2002 | Kelly et al. | |
| 6,478,677 | B1 | 11/2002 | Moody | |
| 6,482,088 | B2 | 11/2002 | Santini, Jr. | |
| 6,514,144 | B2 | 2/2003 | Riendeau et al. | |
| 6,524,184 | B1 | 2/2003 | Lind et al. | |
| 6,524,185 | B2 | 2/2003 | Lind | |
| 6,533,660 | B2 | 3/2003 | Seelig et al. | |
| 6,533,664 | B1 | 3/2003 | Crumby | |
| 6,537,150 | B1 | 3/2003 | Luciano et al. | |
| 6,565,091 | B2 | 5/2003 | Weingardt | |
| 6,569,017 | B2 | 5/2003 | Enzminger et al. | |
| 6,581,935 | B1 | 6/2003 | Odom | |
| 6,585,590 | B2 | 7/2003 | Malone | |
| 6,599,188 | B2 | 7/2003 | Hirsch et al. | |
| 6,605,001 | B1 | 8/2003 | Tarantino | |
| 6,607,440 | B2 | 8/2003 | Santini, Jr. | |
| 6,609,973 | B1 | 8/2003 | Weiss | |
| 6,645,071 | B2 | 11/2003 | Perrie et al. | |
| 6,645,072 | B1 | 11/2003 | Kellen | |
| 6,656,044 | B1 | 12/2003 | Lewis | |
| 6,656,045 | B2 | 12/2003 | Wei et al. | |
| 6,672,960 | B1 | 1/2004 | B-Jensen | |
| 6,676,516 | B2 | 1/2004 | Baerlocher et al. | |
| 6,722,655 | B1 | 4/2004 | Camero | |
| 6,722,981 | B2 | 4/2004 | Kaminkow et al. | |
| 6,722,982 | B2 | 4/2004 | Kaminkow et al. | |
| 6,755,738 | B2 | 6/2004 | Glasson et al. | |
| 6,755,739 | B2 | 6/2004 | Santini, Jr. | |
| 6,761,632 | B2 | 7/2004 | Bansemer et al. | |
| 6,764,397 | B1 | 7/2004 | Robb | |
| 6,780,108 | B1 | 8/2004 | Luciano, Jr. et al. | |
| 6,783,457 | B2 | 8/2004 | Hughs-Baird et al. | |
| 6,802,776 | B2 | 10/2004 | Lind et al. | |
| 6,824,465 | B2 | 11/2004 | Luciano, Jr. | |
| 6,832,956 | B1 | 12/2004 | Boyd et al. | |
| 6,835,138 | B2 | 12/2004 | Baeg | |
| 6,840,858 | B2 | 1/2005 | Adams | |
| 6,910,962 | B2 | 6/2005 | Marks et al. | |
| 6,981,635 | B1 | 1/2006 | Hughs-Baird et al. | |
| 7,040,984 | B2 | 5/2006 | Mead | |
| 7,160,186 | B2 | 1/2007 | Cuddy et al. | |
| 7,160,188 | B2 | 1/2007 | Kaminkow et al. | |
| 7,182,689 | B2 | 2/2007 | Hughs-Baird et al. | |
| 7,235,011 | B2 | 6/2007 | Randall et al. | |
| 7,258,608 | B2 * | 8/2007 | Khal | 463/18 |
| 7,273,415 | B2 | 9/2007 | Cregan et al. | |
| 7,303,469 | B2 | 12/2007 | Kaminkow | |
| 7,306,519 | B2 | 12/2007 | Baerlocher | |
| 7,314,409 | B2 | 1/2008 | Maya et al. | |
| 7,399,227 | B2 | 7/2008 | Michaelson et al. | |
| 7,682,241 | B2 | 3/2010 | Baerlocher | |
| 8,025,561 | B2 | 9/2011 | Reddicks et al. | |
| 2002/0045472 | A1 | 4/2002 | Adams | |
| 2002/0052231 | A1 | 5/2002 | Fioretti | |
| 2002/0094859 | A1 | 7/2002 | Hirsch et al. | |
| 2002/0098882 | A1 | 7/2002 | Lind et al. | |
| 2002/0098883 | A1 | 7/2002 | Packes, Jr. et al. | |
| 2002/0111207 | A1 | 8/2002 | Lind et al. | |
| 2002/0111214 | A1 | 8/2002 | Lind et al. | |
| 2002/0113369 | A1 | 8/2002 | Weingardt | |
| 2002/0117803 | A1 | 8/2002 | Weingardt | |
| 2002/0137562 | A1 | 9/2002 | Malone | |
| 2002/0155877 | A1 | 10/2002 | Enzminger et al. | |
| 2002/0169018 | A1 | 11/2002 | Schneier et al. | |
| 2002/0177478 | A1 | 11/2002 | Glasson et al. | |
| 2003/0127793 | A1 | 7/2003 | Adams | |
| 2003/0144050 | A1 | 7/2003 | Keaton et al. | |
| 2003/0171986 | A1 | 9/2003 | Itkis et al. | |
| 2003/0178771 | A1 | 9/2003 | Banyai | |
| 2003/0181234 | A1 | 9/2003 | Falciglia, Sr. | |
| 2003/0193136 | A1 | 10/2003 | Walker et al. | |
| 2003/0195032 | A1 | 10/2003 | Enzminger et al. | |
| 2004/0009806 | A1 | 1/2004 | Odom | |
| 2004/0048647 | A1 | 3/2004 | Lind et al. | |
| 2004/0106445 | A1 | 6/2004 | Perrie et al. | |
| 2004/0121834 | A1 | 6/2004 | Libby et al. | |
| 2004/0130096 | A1 | 7/2004 | Duhamel | |
| 2004/0166920 | A1 | 8/2004 | Boyd et al. | |
| 2005/0152499 | A1 | 8/2004 | Lind et al. | |
| 2004/0176169 | A1 | 9/2004 | Lind et al. | |
| 2004/0178579 | A1 | 9/2004 | Lowell et al. | |
| 2004/0204225 | A1 | 10/2004 | Campo et al. | |
| 2004/0214626 | A1 | 10/2004 | Lind et al. | |
| 2004/0235555 | A1 | 11/2004 | Yarbrough et al. | |
| 2004/0242310 | A1 | 12/2004 | Perkins | |
| 2004/0251628 | A1 | 12/2004 | Kilby | |
| 2004/0266509 | A1 | 12/2004 | Bennett et al. | |
| 2005/0059449 | A1 | 3/2005 | Yarbrough | |
| 2005/0059461 | A1 | 3/2005 | Ching et al. | |

(56) References Cited

U.S. PATENT DOCUMENTS

| | | | | |
|---|---|---|---|---|
| 2005/0059467 | A1 | 3/2005 | Saffari et al. | |
| 2005/0059468 | A1 | 3/2005 | Cannon | |
| 2005/0059469 | A1 | 3/2005 | Gail et al. | |
| 2005/0059470 | A1 | 3/2005 | Cannon | |
| 2005/0059471 | A1 | 3/2005 | Cannon | |
| 2005/0064932 | A1 | 3/2005 | Cannon | |
| 2005/0075161 | A1 | 4/2005 | McGlone et al. | |
| 2005/0096119 | A1 | 5/2005 | Lind et al. | |
| 2005/0096123 | A1 | 5/2005 | Cregan et al. | |
| 2005/0101370 | A1* | 5/2005 | Lind et al. | 463/19 |
| 2005/0101387 | A1 | 5/2005 | Wolf | |
| 2005/0119042 | A1 | 6/2005 | Chamberlain et al. | |
| 2005/0130730 | A1 | 6/2005 | Lind et al. | |
| 2005/0148382 | A1 | 7/2005 | Fox | |
| 2005/0164771 | A1* | 7/2005 | Lind et al. | 463/19 |
| 2005/0164772 | A1* | 7/2005 | Lind et al. | 463/19 |
| 2005/0164773 | A1 | 7/2005 | Lind et al. | |
| 2005/0167916 | A1 | 8/2005 | Banyai | |
| 2005/0187014 | A1 | 8/2005 | Saffari et al. | |
| 2005/0192081 | A1* | 9/2005 | Marks et al. | 463/20 |
| 2005/0227753 | A1 | 10/2005 | Luciano | |
| 2005/0255906 | A1 | 11/2005 | Lind et al. | |
| 2006/0084490 | A1 | 4/2006 | Khal | |
| 2006/0189375 | A1 | 8/2006 | Dodge | |
| 2006/0246977 | A1* | 11/2006 | Cannon | 463/13 |
| 2007/0021185 | A1 | 1/2007 | Walker et al. | |
| 2007/0117611 | A1* | 5/2007 | Dodge | 463/18 |
| 2008/0102952 | A1 | 5/2008 | Walker et al. | |
| 2008/0254894 | A1* | 10/2008 | Michaelson et al. | 463/42 |
| 2009/0197664 | A1* | 8/2009 | Schultz | 463/18 |
| 2010/0120489 | A1 | 5/2010 | Meyer | |
| 2011/0028201 | A1 | 2/2011 | Warner et al. | |

FOREIGN PATENT DOCUMENTS

| | | |
|---|---|---|
| WO | WO 2004/070551 | 8/2004 |
| WO | WO 2004/105903 | 12/2004 |
| WO | WO 2005/060567 | 7/2005 |
| WO | WO 2005/072096 | 8/2005 |
| WO | WO 2005/079142 | 9/2005 |

* cited by examiner

GAMING SYSTEM AND METHOD PROVIDING A KENO GAME IN WHICH NUMBERS CAN BE SELECTED MORE THAN ONCE

COPYRIGHT NOTICE

A portion of the disclosure of this patent document contains or may contain material that is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Keno in the United States traces back to a "Chinese lottery" game brought to the United States by Chinese immigrants in the 1800s. The "Chinese lottery" game utilized a board and a set of up to 120 characters instead of numbers. Early versions of American Keno used characters on Keno tickets rather than the numbers used today. The American Keno game reduced the number of characters to the more familiar eighty.

When gambling was legalized in the state of Nevada in 1931, the "Chinese lottery" game was instead referred to as Horse Race Keno, reflecting the idea that the numbers are horses and the players want their wagered-on horses to come in. Later, the name was shortened to simply Keno, although the game is still often referred to as Horse Race Keno.

Keno is similar to a lottery game. The goal in Keno, like in a lottery, is for a player to choose winning numbers from a plurality of numbers. In most standard versions of paper or video based Keno, a player receives a card with eighty squares numbered one to eighty and arranged in eight rows of ten. The player can wager on any number or numbers up to a designated quantity of numbers, such as ten numbers. The player chooses numbers on which the player desires to wager by marking those numbers on a Keno card (such as in a paper version of Keno) or by selecting the numbers on a keno display (such as in a video version of Keno). A clerk or the processor of the video display records the player's wager(s). The player pays for each number played or wagered on.

In one known paper version, the Keno numbers also appear on eighty ping pang type balls that can be tossed about in a clear plastic sphere or spun around in a wire bird cage. Keno numbers were at one time drawn from such apparatuses without replacement using a manually powered Keno goose. In one known video version, a computer generates the Keno numbers without replacement using a random number generator. After a number is chosen, that number is shown electronically on Keno boards throughout the casino or on the video display. An award is provided to the player based on a quantity of matches between the player selected number(s) and the game generated number(s).

Many casinos offer "multi-race" cards that enable the player to play the same set of numbers over multiple games. One type of "multi-play" game enables the player to wager on a single set of numbers over as many as twenty games. When finished, the player must return to the Keno station and cash in any wins. "Stray and play" tickets are also available, and enable the player to play a version of Keno called "walk away Keno." Here, players can purchase a Keno ticket for an extended number of games, enjoy other activities in the casino, and return at a later time or even a later date to have the tickets checked by a computer for winning games.

Another option for Keno players is a combination or "way" ticket. A combination ticket enables the player to group different numbers, wherein each group has the same amount numbers, creating more than one way to win. For example, a 3×3×3, nine spot ticket enables the player to select a combination of three groups of three numbers. The player can, for example, mark a first group of three numbers with the letter "A," mark a second group with the letter "B," and mark a third group the letter "C." This ticket enables the player to win on any winning combination of three numbers for any of the three groups. Hitting any winning combination pays as though a single ticket had been played. Essentially, the player plays three games on one card. In some Keno games, playing three numbers in three games enables the player to play, or provides to the player, an additional nine spot game.

The "way" ticket supposedly makes Keno more exciting, enabling players to wager more money on more numbers. In reality, playing a way or combination ticket offers no mathematical advantage, and no disadvantage, to the player. Some casinos offer discounted minimum wagers with "way" tickets. If the player plays three or more ways, many casinos will discount the price per "way" (e.g., let the player wager $0.50 per wager instead of a usual $1 minimum). However, the casino only pays back on the player's actual wager.

Certain variations of Keno have expected returns that are relatively constant regardless of how many numbers the player plays. That is, it does not mathematically matter how many numbers the player chooses or if the player combines wagers. The player can choose fewer numbers if the player likes to win a smaller amount but a little more often. The player can choose more numbers if the player does not care about the frequency of the wins but wants bigger payouts. In other versions, the expected value fluctuates based on how many numbers the player plays.

Keno is a popular game that has been embodied in various types of gaming systems. A need exists to provide variations of Keno to make the play of Keno more enjoyable, fun, and exciting for players.

SUMMARY

Various embodiments of the present disclosure are directed to a gaming system and method providing a Keno game in which numbers can be selected more than once by the gaming system. In various embodiments, the gaming system provides an additional award opportunity based on the gaming system selecting and including a plurality of instances of at least one of the numbers in the gaming system's number set. The Keno game of the present disclosure thus enables a player to achieve a larger quantity of matches than a corresponding standard Keno game in which numbers cannot be selected more than once while also enabling a player to achieve an additional award opportunity.

In operation of one embodiment, the gaming system initiates a play of the Keno game of the present disclosure. The gaming system displays a plurality of different numbers and receives a selection from a player of one or more of the numbers up to a first designated quantity of the numbers to form a player number set. The gaming system randomly selects a second designated quantity of the numbers to form a gaming system number set, wherein each of the numbers can be selected more than once. The gaming system determines any awards based on a comparison of the player number set with the gaming system number set, and provides any determined awards to the player. The gaming system determines whether an additional award opportunity triggering event occurred. The additional award opportunity triggering event is associated with the gaming system number set including a plurality of instances of a same one of the numbers. If the additional award opportunity triggering event occurred, the gaming system provides the player with an additional award opportunity.

In one embodiment, the additional award opportunity triggering event occurs when the gaming system number set includes a plurality of instances of each of at least a designated quantity of at least one of the numbers.

In another embodiment, the additional award opportunity triggering event occurs when the gaming system number set includes at least a designated quantity of at least two instances of any one of the numbers.

In another embodiment, the additional award opportunity triggering event occurs when the gaming system number set includes at least a first designated quantity of at least two instances of each of at least a second designated quantity of at least one of the numbers.

It should thus be appreciated that the Keno game of the present disclosure provides an increased level of excitement and enjoyment for certain players.

Additional features and advantages are described herein, and will be apparent from, the following Detailed Description and the Figures.

DETAILED DESCRIPTION

Keno Game in which Numbers can be Selected More than Once

Various embodiments of the present disclosure are directed to a gaming system and method providing a Keno game in which numbers can be selected more than once by the gaming system. While the Keno game of the present disclosure is a primary game in the embodiments described below, it should be appreciated that the Keno game may additionally or alternatively be employed as or in association with a secondary game or a bonus game. Moreover, while the credit balances, the wagers, and the awards are displayed as an amount of monetary credits or currency in the embodiments described below, one or more of such credit balances, such wagers, and such awards may be for non-monetary credits, promotional credits, and/or player tracking points or credits.

Figure 1:
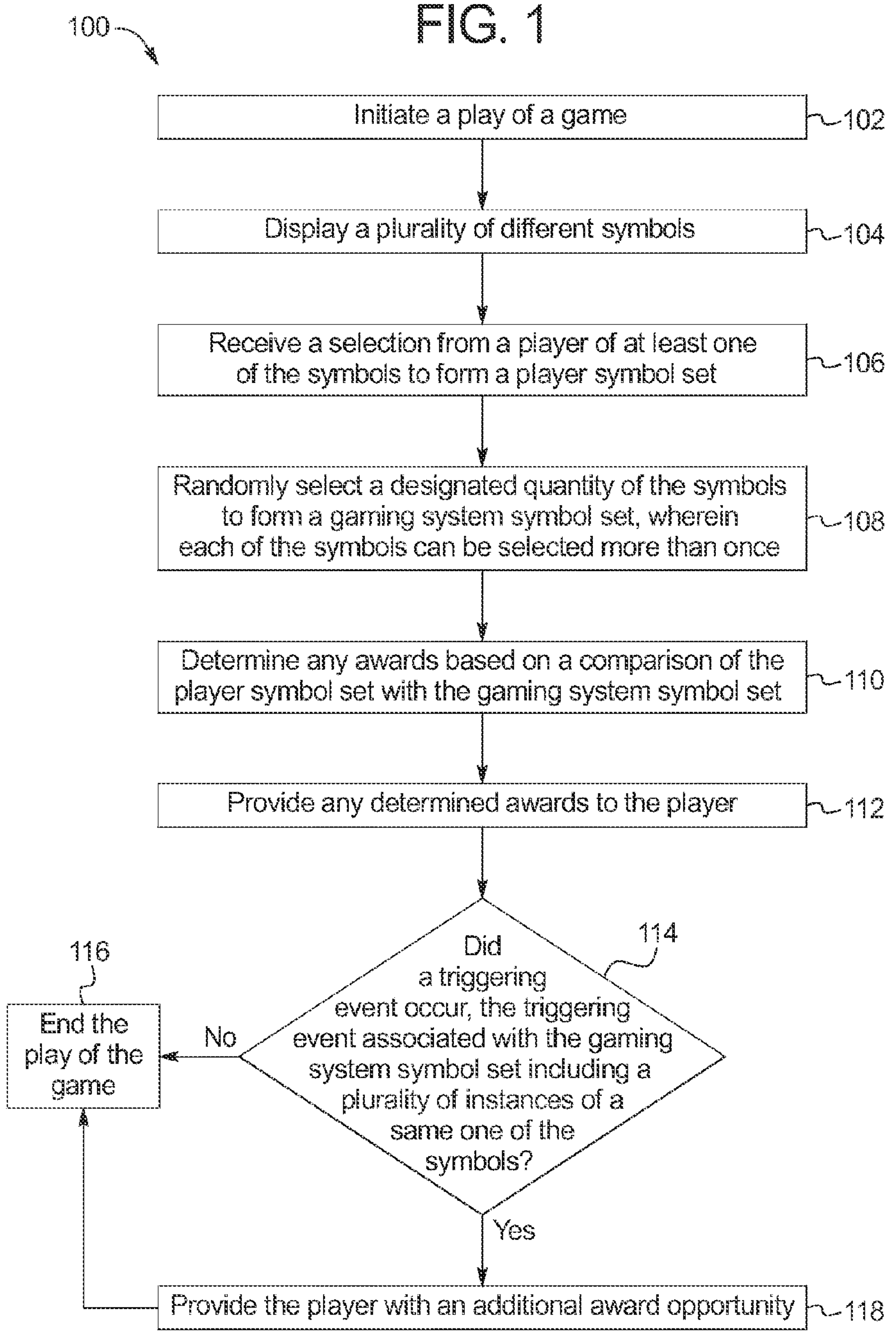
FIG. 1 is a flowchart illustrating an example method of operating an embodiment of the gaming system of the present disclosure configured to operate an example Keno game in which each number can be selected more than once.

FIG. 1 illustrates a flowchart of an example process or method 100 of operating the gaming system of the present disclosure. In various embodiments, process 100 is represented by a set of instructions stored in one or more memories and executed by one or more processors. Although process 100 is described with reference to the flowchart shown in FIG. 1, it should be appreciated that many other processes of performing the acts associated with this illustrated process may be employed. For example, the order of certain of the illustrated blocks and/or diamonds may be changed, certain of the illustrated blocks and/or diamonds may be optional, and/or certain of the illustrated blocks and/or diamonds may not be employed.

In operation of this example embodiment, the gaming system initiates a play of the game of the present disclosure, as indicated by block 102. The gaming system displays a plurality of different symbols (such as numbers), as indicated by block 104. The gaming system receives a selection from a player of at least one of the symbols to form a player symbol set, as indicated by block 106. The gaming system randomly selects a designated quantity of the symbols to form a gaming system symbol set, wherein each of the symbols can be selected more than once, as indicated by block 108. The gaming system determines any awards based on a comparison of the player symbol set with the gaming system symbol set, as indicated by block 110, and provides any determined awards to the player, as indicated by block 112.

The gaming system determines whether an additional award opportunity triggering event occurred, as indicated by diamond 114. The additional award opportunity triggering event is associated with the gaming system symbol set including a plurality of instances of a same one of the symbols. If the additional award opportunity triggering event did not occur, the gaming system ends the play of the game, as indicated by block 116. If, on the other hand, the additional award opportunity triggering event occurred, the gaming system provides the player with an additional award opportunity, as indicated by block 118, and process 100 proceeds to block 116.

In one embodiment, each of the symbols can be selected more than once by the gaming system. In another embodiment, a plurality of, but less than all of, the symbols may be selected more than once by the gaming system. In another embodiment, only one of the symbols may be selected more than once by the gaming system. In another embodiment, a designated one or a designated plurality of the symbols may be selected more than once by the gaming system. In various embodiments, such symbol(s) may be selected up to a designated quantity of times of by the gaming system.

In one embodiment, the additional award opportunity triggering event occurs when the gaming system symbol set includes a plurality of instances of each of at least a designated quantity of at least one of the symbols. In one example, the additional award opportunity triggering event occurs when the gaming system symbol set includes a plurality of instances of each of at least three of the symbols. For instance, in an example in which the symbols are numbers, the additional award opportunity triggering event occurs when the gaming system number set includes two instances of the number 10, three instances of the number 12, and two instances of the number 13.

In another embodiment, the additional award opportunity triggering event occurs when the gaming system symbol set includes a plurality of instances of each of at least a designated quantity of at least one of the symbols also included in the player symbol set. In one example, the additional award opportunity triggering event occurs when the gaming system symbol set includes a plurality of instances of each of at least two of the symbols also included in the player symbol set. For instance, in an example in which the symbols are numbers, the additional award opportunity triggering event occurs when the gaming system number set includes two instances of the number 7 and three instances of the number 31 and the player number set also includes the numbers 7 and 31.

In another embodiment, the additional award opportunity triggering event occurs when the gaming system symbol set includes at least a designated quantity of at least two instances of any one of the symbols. In one example, the additional award opportunity triggering event occurs when the gaming system symbol set includes at least three instances of any one of the symbols. For instance, in an example in which the symbols are numbers, the additional award opportunity triggering event occurs when the gaming system number set includes four instances of the number 10.

In another embodiment, the additional award opportunity triggering event occurs when the gaming system symbol set includes at least a designated quantity of at least two instances of any one of the symbols also included in the player symbol set. In one example, the additional award opportunity triggering event occurs when the gaming system symbol set includes at least three instances of any one of the symbols also included in the player symbol set. For instance, in an example in which the symbols are numbers, the additional award opportunity triggering event occurs when the gaming system number set includes four instances of the number 9 and the player number set also includes the number 9.

In another embodiment, the additional award opportunity triggering event occurs when the gaming system symbol set includes at least a first designated quantity of at least two instances of each of at least a second designated quantity of at least one of the symbols. In one example, the additional award opportunity triggering event occurs when the gaming system symbol set includes at least three instances of each of at least two of the symbols. For instance, in an example in which the symbols are numbers, the additional award opportunity triggering event occurs when the gaming system number set includes three instances of the number 10, four instances of the number 12, and three instances of the number 13.

In another embodiment, the additional award opportunity triggering event occurs when the gaming system symbol set includes at least a first designated quantity of at least two instances of each of at least a second designated quantity of at least one of the symbols also included in the player symbol set. In one example, the additional award opportunity triggering event occurs when the gaming system symbol set includes at least three instances of each of at least two of the symbols also included in the player symbol set. For instance, in an example in which the symbols are numbers, the additional award opportunity triggering event occurs when the gaming system number set includes three instances of the number 4, four instances of the number 70, and three instances of the number 71, and the player number set also includes the numbers 4, 70, and 71.

In one embodiment, the additional award opportunity includes one or more free plays of the Keno game of the present disclosure. In another embodiment, the additional award opportunity includes one or more free plays of a standard Keno game (i.e., a Keno game in which numbers cannot be selected more than once). In another embodiment, the additional award opportunity includes one or more free plays of the game of the present disclosure including a reduced quantity of symbols (such as the numbers 1 through 25 instead of the numbers 1 through 80). In another embodiment, the additional award opportunity includes one or more free plays of a standard Keno game including a reduced quantity of numbers. It should be appreciated that the paytable employed for such free plays may be the same as or different than the paytable employed for the primary Keno game. In one example in which the additional award opportunity includes a plurality of free plays of any of the above Keno games, the gaming system enables the player to select symbols to form a player symbol set, and employs that player symbol set for each of the free plays, while in another example the gaming system enables the player to select symbols to form a (possibly different) player symbol set for each individual free play.

In certain embodiments, the additional award opportunity triggering event affects which additional award opportunity is provided to the player. In one embodiment, the rarer the additional award opportunity triggering event, the more lucrative (or potentially lucrative) the additional award opportunity provided to the player. For example, the occurrence of a relatively rare additional award opportunity triggering event, such as the gaming system symbol set including a plurality of instances of each of at least five of the symbols, causes the gaming system to provide an additional award opportunity including five free spins of an award wheel (i.e., a relatively lucrative additional award opportunity), while the occurrence of a relatively common additional award opportunity triggering event, such as the gaming system symbol set including a plurality of instances of only one of the symbols, causes the gaming system to provide an additional award opportunity including one free spin of the award wheel (i.e., a less lucrative additional award opportunity). Thus, in this example, the rarer the additional award opportunity triggering event, the more free spins the gaming system provides to the player (and vice-versa).

In another example, the occurrence of a relatively rare additional award opportunity triggering event, such as the gaming system symbol set including four instances of one of the symbols, causes the gaming system to provide an additional award opportunity including an award of 500 credits (i.e., a relatively lucrative additional award opportunity), while the occurrence of a relatively common additional award opportunity triggering event, such as the gaming system symbol set including two instances of one of the symbols, causes the gaming system to provide an additional award opportunity including an award of 100 credits (i.e., a less lucrative additional award opportunity). Thus, in this example, the rarer the additional award opportunity triggering event, the more credits the gaining system provides to the player (and vice-versa).

In one embodiment, the additional award opportunity provided to the player varies based on how many of the symbols are included in the gaming system symbol set at least a designated quantity of times. In one such example, the quantity of the symbols that are included in the gaming system symbol set at least the designated quantity of times determines how many symbols the gaming system enables the player to select to include in the player symbol set for an additional award opportunity including a free play of a Keno game (such as any of those described above). For instance, if at least the designated quantity of instances of each of four of the symbols are included in the gaming system symbol set, the gaming system enables the player to select four symbols to include in the player symbol set for the free play of the Keno game.

In another embodiment, the additional award opportunity provided to the player varies based on a total quantity of instances of symbols included at least a designated quantity of times in the gaming system symbol set. In one such example, the total quantity of instances of symbols included at least the designated quantity of times in the gaming system symbol set determines how many symbols the gaming system enables the player to select to include in the player symbol set for an additional award opportunity including a free play of a Keno game (such as any of those described above). For instance, if the designated quantity of times is two and if two instances of each of two of the symbols are included in the gaming system symbol set, the gaming system enables the player to select four symbols to include in the player symbol set for the free play of the Keno game.

In another embodiment, the additional award opportunity provided to the player varies based on how many of the symbol(s) included at least twice in the gaming system symbol set are also included in the player symbol set. In one such example, the gaming system provides a relatively more lucrative additional award opportunity when a relatively large quantity of the symbol(s) included at least twice in the gaming system symbol set are also included in the player symbol set and a relatively less lucrative additional award opportunity when a relatively small quantity of the symbol(s) included at least twice in the gaming system symbol set are also included in the player symbol set. For instance, in an example in which the symbols are numbers, if the gaming system number set includes the numbers 1, 1, 2, 2, 3, and 3, and the player number set includes the numbers 1, 2, and 3, the gaming system provides the player a more lucrative additional award opportunity than if the player number set included the numbers 4, 5, and 6.

It should be appreciated that, in various other embodiments, the additional award opportunity may be any suitable award or opportunity for the player to win an award such as, but not limited to, one or more of: (1) monetary credits or currency; (2) non-monetary credits or currency; (3) a modifier such as a multiplier used to modify one or more awards; (4) one or more free plays of a game (such as one or more free spins of a spinning reel type game); (5) one or more plays of one or more bonus games (such as a free spin of an award wheel); (6) one or more lottery based awards, such as lottery or drawing tickets; (7) a wager match for one or more plays of the primary wagering game; (8) an increase in the average expected payback percentage of the bonus game and/or the primary wagering game for one or more plays; (9) one or more comps, such as a free dinner or a free night's stay at a hotel; (10) one or more bonus or promotional credits usable for online play; (11) a lump sum of player tracking points; (12) a multiplier for player tracking points or credits; (13) an increase in a membership or player tracking level; (14) coupons or promotions usable within the gaming establishment and/or outside of the gaming establishment (e.g., a 20% off coupon for use at a retail store or a promotional code providing a deposit match for use in association with an online casino); (15) an access code usable to unlock content on the internet; (16) a progressive jackpot or other progressive award; (17) a high value product such as a car; and (18) a low value product such as a teddy bear.

In certain embodiments, the gaming system is associated with a plurality of different additional award opportunities. In one such embodiment, each symbol is associated with a different additional award opportunity. For instance, in an example in which the symbols are numbers, the number 1 is associated with an additional award opportunity including a free spin of a plurality of reels, the number 2 is associated with an additional award opportunity including a free spin of a wheel, the number 3 is associated with an additional award opportunity including a free play of a blackjack game, the number 4 is associated with an additional award opportunity including a free play of a poker game, and so on.

In another such embodiment, each of a plurality of groups of the symbols is associated with a different additional award opportunity (i.e., each of the symbols in a given one of the groups is associated with the same additional award opportunity). For instance, in an example in which the symbols are numbers, the numbers 1 through 5 are each associated with an additional award opportunity including a free spin of a plurality of reels, the numbers 6 through 10 are each associated with an additional award opportunity including a free spin of a wheel, the numbers 11 through 15 are each associated with an additional award opportunity including a free play of a blackjack game, the numbers 16 through 20 are each associated with an additional award opportunity including a free play of a poker game, and so on.

In such embodiments, when the additional award opportunity triggering events occurs in association with one of the symbols, the gaming system provides the player with the additional award opportunity associated with that symbol. It should thus be appreciated that, in these embodiments, the gaming system enables the player to choose which additional award opportunities will be available to the player during play of the Keno game by picking specific symbols. For instance, if the player enjoys wheel spin bonus games, the player may select symbols associated with a wheel spin additional award opportunity to include in the player's player symbol set. In one embodiment, each of the additional award opportunities have the same or substantially the same average expected payback percentage, while in other embodiments at least two of the additional award opportunities have different average expected payback percentages.

FIGS. 2A, 2B, 2C, and 2D illustrate screen shots of an example embodiment of the gaming system of the present disclosure configured to operate an example of the Keno game of the present disclosure in which each of the symbols can be selected more than once by the gaming system. In this example, the Keno game is associated with symbols in the form of the numbers 1 through 80, though it should be appreciated that the Keno game may be associated with any suitable numbers or range of numbers. It should also be appreciated that, in certain embodiments, the Keno game employs any suitable symbols (such as letters, characters, themed images, and the like) instead of or in addition to numbers.

In this example, the gaming system displays (such as on a display device 1116 or 1118, described below) a Keno board 200 including a plurality of Keno board positions 201 through 280. The gaming system displays a different one of the numbers 1 through 80 at each of the Keno board positions. The gaming system also displays a plurality of displays or meters including: a credit meter 294 that displays a player's credit balance; a wager display 296 that displays any wagers placed on a play of the Keno game; an award display 298 that displays any awards won for a play of the Keno game; and a message box 291 that displays messages or indications before, during, or after play of the Keno game. While in this illustrated example the gaming system indicates the player's credit balance, the player's wager, and any awards provided to the player in the form of amounts of credits, it should be appreciated that such indications may alternatively or additionally be made in the form of amounts of currency.

Figure 2A:
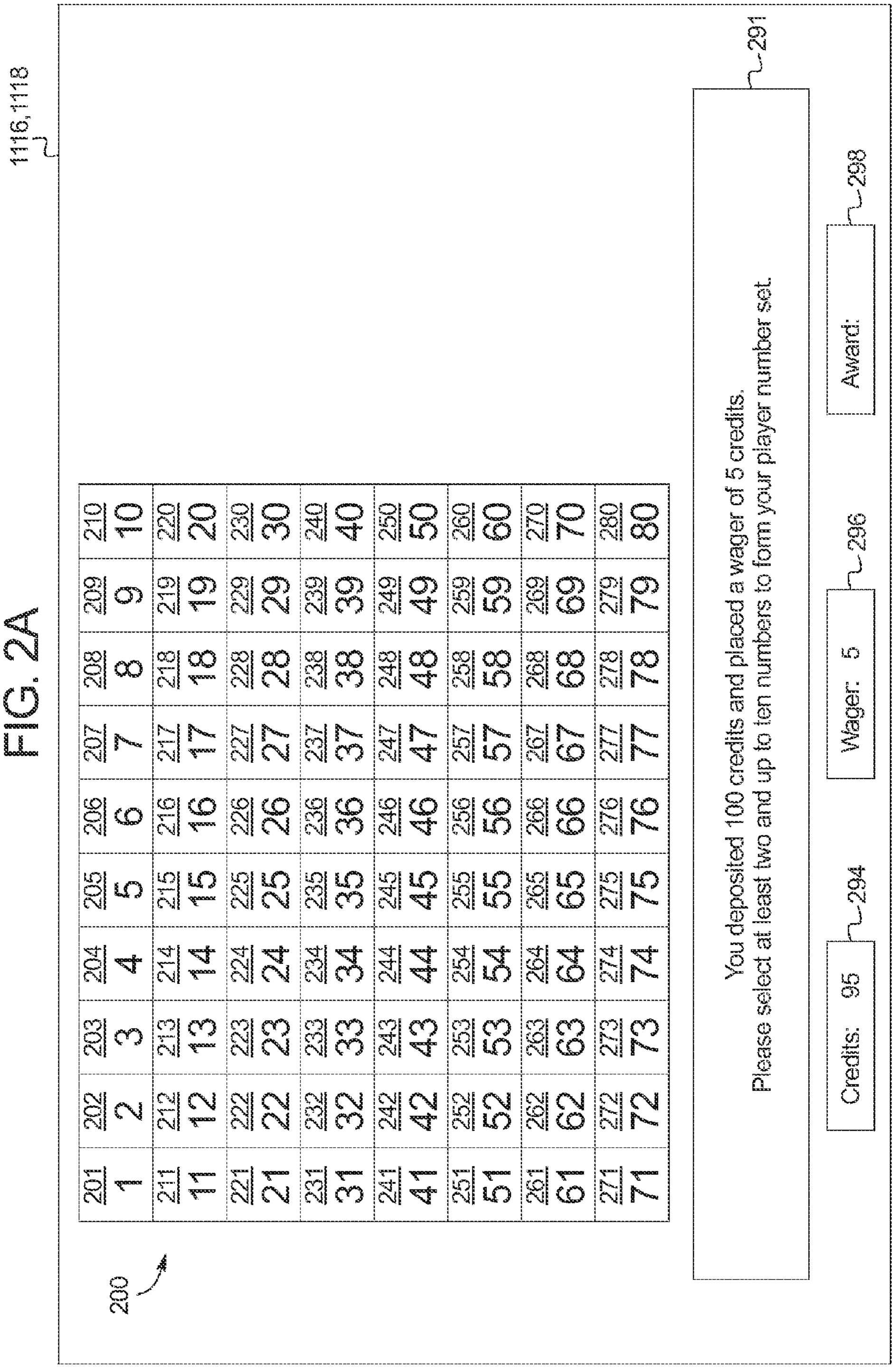
FIGS. 2A, 2B, 2C, and 2D illustrate screen shots of an example embodiment of the gaming system of the present disclosure configured to operate an example Keno game in which each number can be selected more than once.

As illustrated in FIG. 2A, the gaming system receives value, such as currency (or its equivalent), from a player. In this example, the gaming system provides the player 100 credits, which represents the received value. The gaming system subsequently receives a wager of 5 credits from the player for a play of the Keno game. The gaming system displays the player's wager of 5 credits in wager display 296. The gaming system displays the player's total remaining credit balance of 95 credits (i.e., the player's initial credit balance of 100 credits minus the player's wager of 5 credits) in credit meter 294. The gaming system displays the following message in message box 291: "YOU DEPOSITED 100 CREDITS AND PLACED A WAGER OF 5 CREDITS.

PLEASE SELECT AT LEAST TWO AND UP TO TEN NUMBERS TO FORM YOUR PLAYER NUMBER SET!"

Figure 2B:
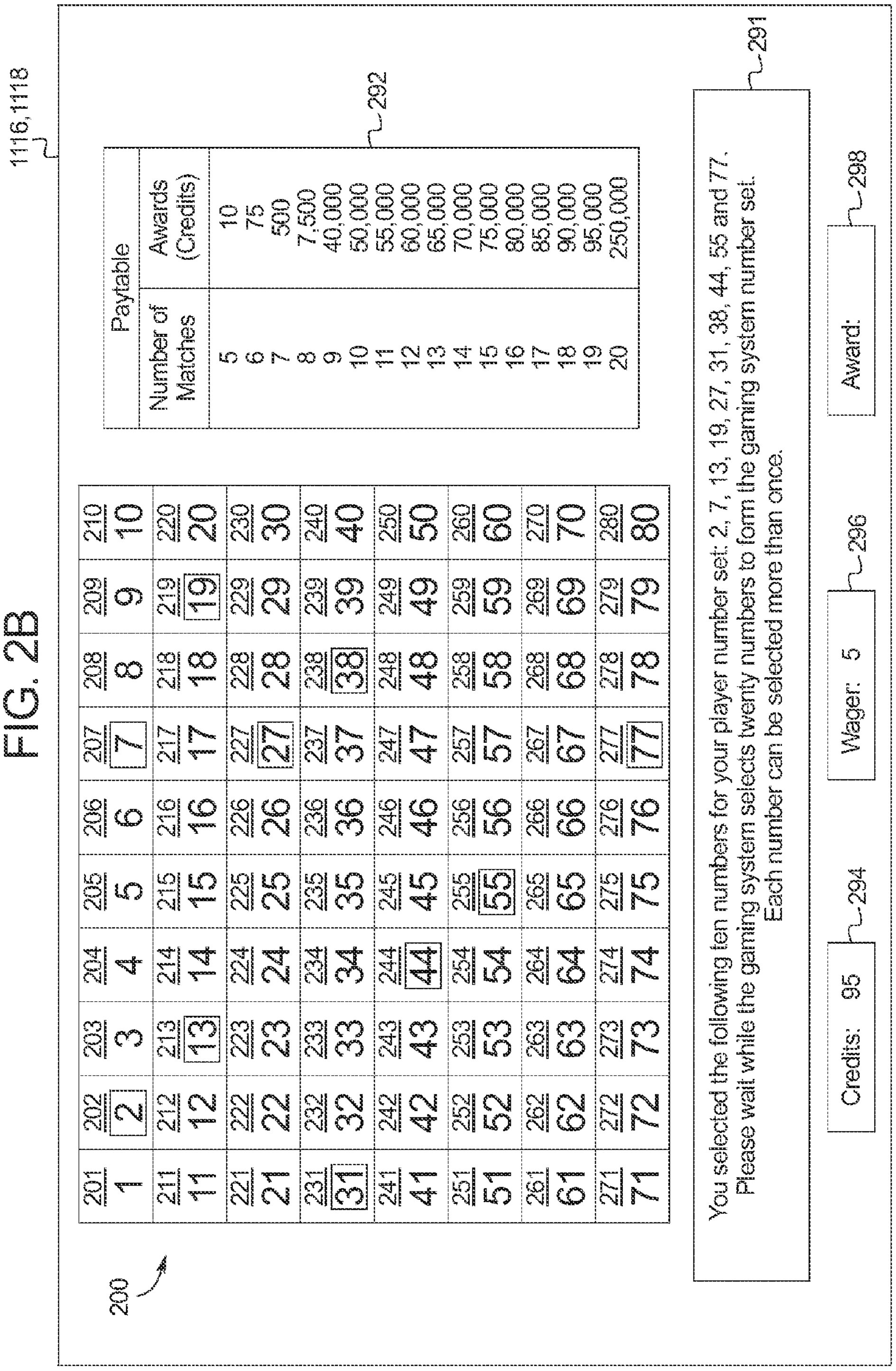

In this example, upon initiation of the play of the Keno game, the gaming system enables the player to select between two and ten of the numbers (such as via a touch screen or a dedicated button or buttons, as described below). In this example, as illustrated in FIG. 2B, the gaming system receives a selection of the following ten numbers to form the player number set: 2, 7, 13, 19, 27, 31, 38, 44, 55, and 77. The numbers forming the player number set are each boxed for clarity in FIGS. 2B, 2C, and 2D. The gaming system displays the following message in message box 291: "YOU SELECTED THE FOLLOWING TEN NUMBERS FOR YOUR PLAYER NUMBER SET: 2, 7, 13, 19, 27, 31, 38, 44, 55, AND 77. PLEASE WAIT WHILE THE GAMING SYSTEM SELECTS TWENTY NUMBERS TO FORM THE GAMING SYSTEM NUMBER SET. EACH NUMBER CAN BE SELECTED MORE THAN ONCE."

As also illustrated in FIG. 2B, the gaming system displays a paytable 292 for the Keno game. Paytable 292 indicates a plurality of quantities of matches and an award associated with each such quantity of matches. In this example, paytable 292 indicates a credit payout associated with each respective quantity of matches when a 5 credit wager is placed for a play of the Keno game, when the player selects ten numbers to include in the gaming system number set, and when the gaming system selects twenty numbers to include in the gaming system number set for the play of the Keno game. It should be appreciated that the paytable may vary when one or more of: (a) a wager other than a 5 credit wager is placed, (b) the player selects more than or less than ten numbers to include in the player number set, and (c) the gaming system selects more or less than twenty numbers to include in the gaming system number set.

It should be appreciated that, unlike a standard Keno game in which numbers cannot be selected more than once, the Keno game of the present disclosure in which numbers can be selected more than once enables a player to achieve more matches than the quantity of numbers in the player number set. Thus, in this illustrated example: a quantity of five matching numbers is associated with an award of 10 credits; a quantity of six matching numbers is associated with an award of 75 credits; a quantity of seven matching numbers is associated with an award of 500 credits; a quantity of eight matching numbers is associated with an award of 7,500 credits; a quantity of nine matching numbers is associated with an award of 40,000 credits; a quantity of ten matching numbers is associated with an award of 50,000 credits; a quantity of eleven matching numbers is associated with an award of 55,000 credits; a quantity of twelve matching numbers is associated with an award of 60,000 credits; a quantity of thirteen matching numbers is associated with an award of 65,000 credits; a quantity of fourteen matching numbers is associated with an award of 70,000 credits; a quantity of fifteen matching numbers is associated with an award of 75,000 credits; a quantity of sixteen matching numbers is associated with an award of 80,000 credits; a quantity of seventeen matching numbers is associated with an award of 85,000 credits; a quantity of eighteen matching numbers is associated with an award of 90,000 credits; a quantity of nineteen matching numbers is associated with an award of 95,000 credits; and a quantity of twenty matching numbers is associated with a jackpot award of 250,000 credits.

Figure 2C:
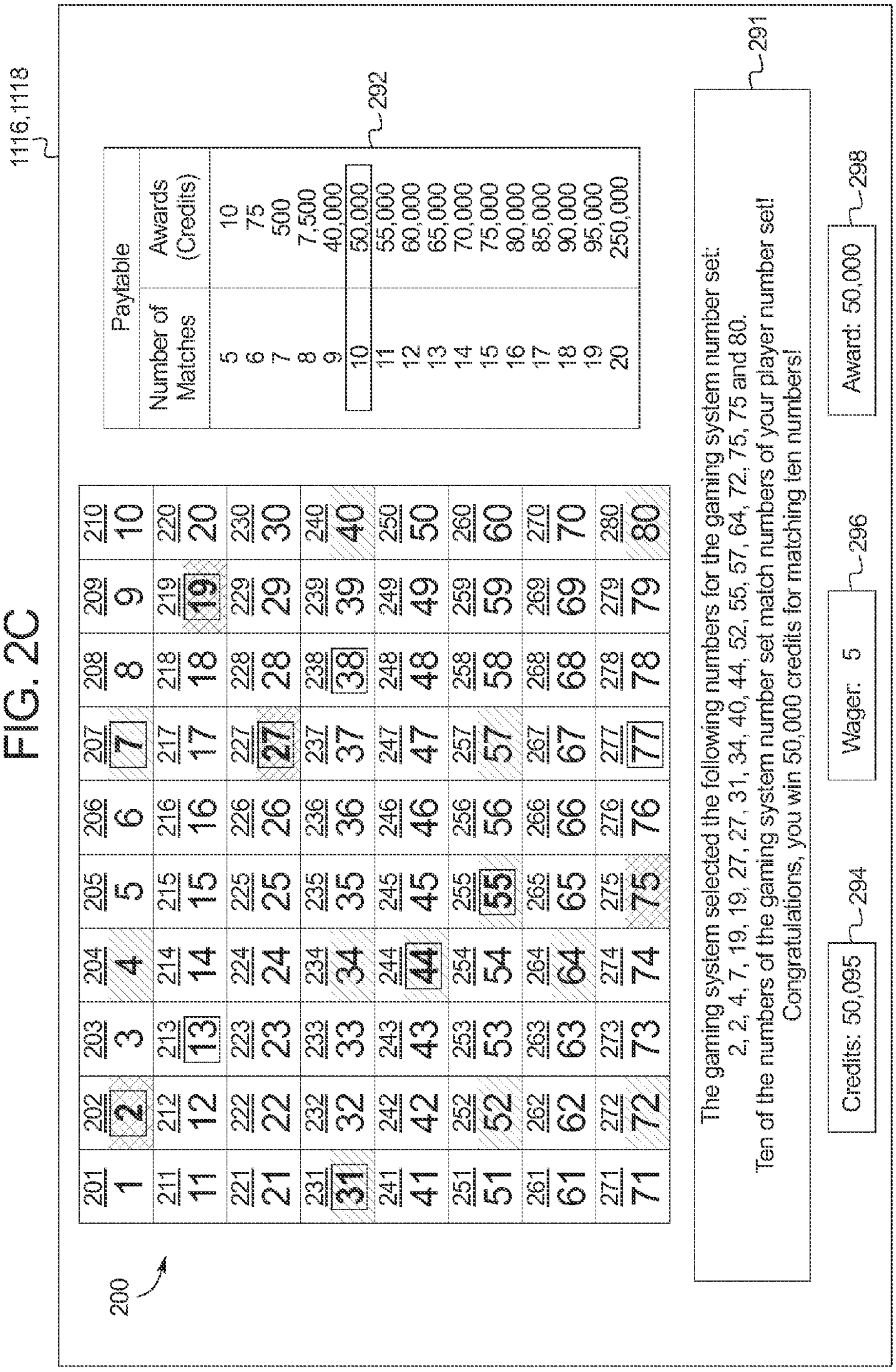

As illustrated in FIG. 2C, the gaming system randomly selects (with replacement) the following twenty numbers from the numbers 1 through 80 to form the gaming system number set: 2, 2, 4, 7, 19, 19, 27, 27, 31, 34, 40, 44, 52, 55, 57, 64, 72, 75, 75, and 80. That is, the gaming system number set includes: (a) two instances of each of the numbers 2, 19, 27, and 75 (which are cross-hatched for clarity in FIGS. 2C and 2D); and (b) one instance of each of the numbers 4, 7, 31, 34, 40, 44, 52, 55, 57, 64, 72, and 80 (which are hatched for clarity in FIGS. 2C and 2D). The gaming system determines any awards by comparing the player number set with the gaming system number set to determine a quantity of matches. More specifically, the gaming system determines how many of the numbers in the gaming system number set are also included in the player number set. In this illustrated example, ten of the numbers of the gaming system number set (2, 2, 7, 19, 19, 27, 27, 31, 44, and 55) are also included in the player number set. Thus, the quantity of matches for this play of the Keno game is equal to ten. The gaming system determines an award of 50,000 credits based on paytable 292 and provides the 50,000 credit award to the player. The gaming system displays the 50,000 credit award in award display 298 and displays the player's updated credit balance of 50,095 credits (i.e., the player's previous credit balance of 95 credits plus the 50,000 credit award) in credit meter 294. The gaming system displays the following message in message box 291: "THE GAMING SYSTEM SELECTED THE FOLLOWING NUMBERS FOR THE GAMING SYSTEM NUMBER SET: 2, 2, 4, 7, 19, 19, 27, 31, 34, 40, 44, 52, 55, 57, 64, 72, 75, 75, AND 80. TEN OF THE NUMBERS OF THE GAMING SYSTEM NUMBER SET MATCH NUMBERS OF YOUR PLAYER NUMBER SET! CONGRATULATIONS, YOU WIN 50,000 CREDITS FOR MATCHING TEN NUMBERS!"

Figure 2D:
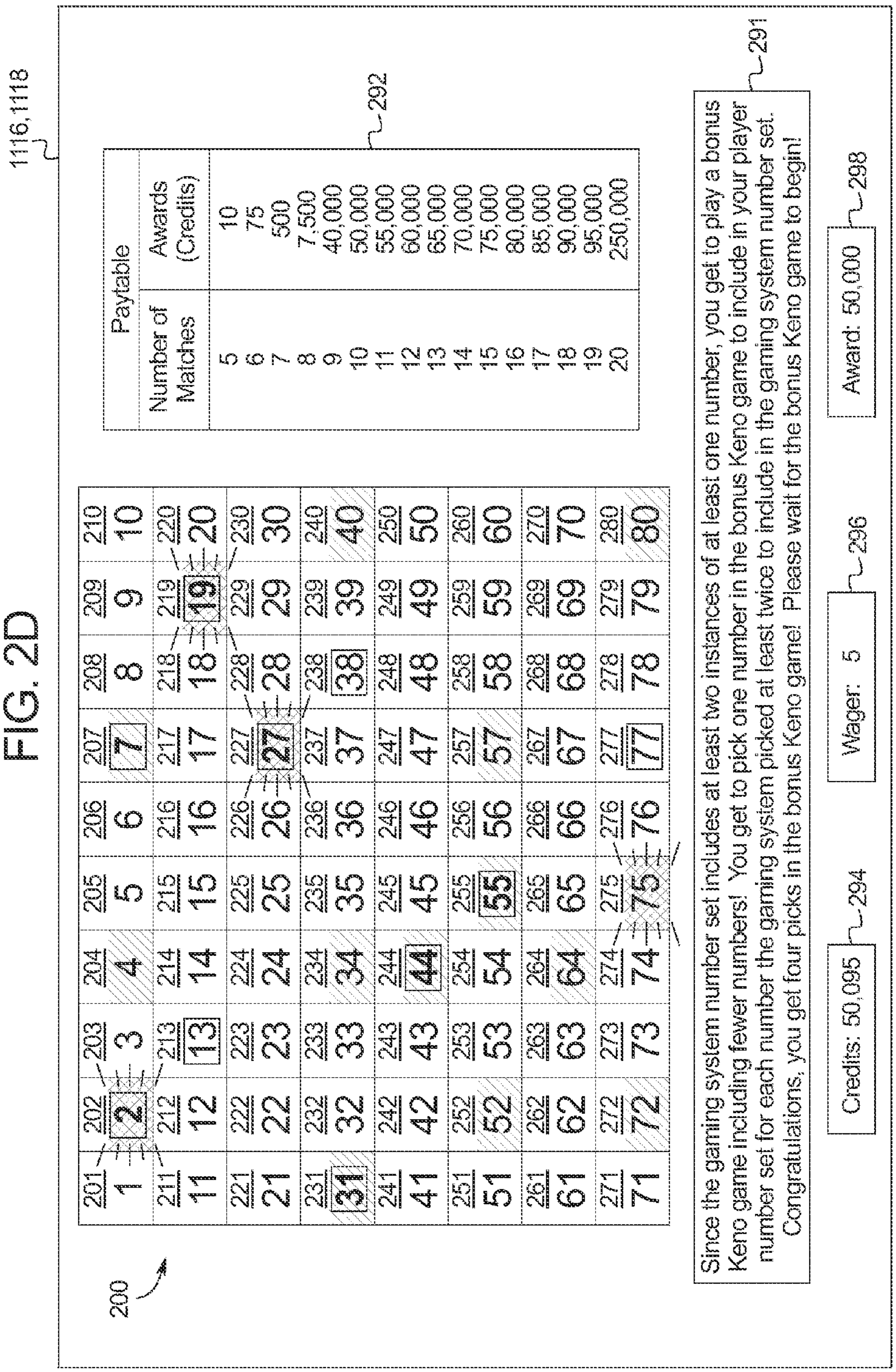

In this example, the gaming system determines whether an additional award opportunity triggering event occurs by determining whether the gaming system number set includes at least two instances of each of at least one of the numbers. In other words, in this example, the additional award opportunity triggering event occurs when the gaming system number set includes at least two instances of each of at least one of the numbers. Here, the gaming system determines that the additional award opportunity triggering event occurred because the gaming system number set includes two instances of each of four of the numbers (i.e., numbers 2, 19, 27, and 75). As illustrated in FIG. 2D, the gaming system displays an indication associated with each of these numbers on Keno game board 200.

In this example, upon the occurrence of the additional award opportunity triggering event, the gaming system provides an additional award opportunity in the form of a play of a bonus Keno game (not shown) including the numbers 1 through 25 rather than the numbers 1 through 80. In this example, the quantity of numbers included more than once in the gaming system number set determines how many of the numbers 1 through 25 the gaming system enables the player to select to include in the player number set in the play of the bonus Keno game. In this illustrated example, two instances of each of four of the numbers (2, 19, 27, and 75) are included in the gaming system number set and, therefore, the gaming system enables the player to select four numbers to include in the player number set in the play of the bonus Keno game. The gaming system displays the following message in message box 291: "SINCE THE GAMING SYSTEM NUMBER SET INCLUDES AT LEAST TWO INSTANCES OF AT LEAST ONE NUMBER, YOU GET TO PLAY A BONUS KENO GAME INCLUDING FEWER NUMBERS! YOU GET TO PICK ONE NUMBER IN THE BONUS KENO GAME TO INCLUDE IN YOUR PLAYER NUMBER SET FOR EACH NUMBER THE GAMING SYSTEM PICKED AT LEAST TWICE TO INCLUDE IN THE GAMING SYSTEM NUM- BER SET. CONGRATULATIONS, YOU GET FOUR PICKS IN THE BONUS KENO GAME! PLEASE WAIT FOR THE BONUS KENO GAME TO BEGIN!"

In various embodiments, the gaming system enables a player to select which specific symbols to include in the player symbol set. In one such embodiment, the gaming system enables the player to select at least a first quantity of the symbols but no more than a second greater quantity of the symbols. In one example, the gaming system enables the player to select at least four of the symbols but no more than ten of the symbols to form the player symbol set. In another example, the gaming system enables the player to select at least one of the symbols but no more than fifteen of the symbols to form the player symbol set. It should be appreciated that the gaming system may enable the player to select any suitable quantity of the symbols or any suitable quantity of the symbols within any suitable range of quantities. In another embodiment, the gaming system enables the player to instruct the gaming system to randomly select one or more of the symbols to include in the player symbol set. That is, in this embodiment, the gaming system selects which specific symbols to include in the player symbol set.

In the example described above with respect to FIGS. 2A, 2B, 2C, and 2D, the gaming system selects a designated quantity of twenty of the symbols to include in the gaming system symbol set, though it should be appreciated that the designated quantity of the symbols selected by the gaming system may be any suitable quantity. In certain embodiments, the designated quantity of the symbols is greater than a quantity of the symbols in the player symbol set. In other embodiments, the designated quantity of the symbols is equal to the quantity of the symbols in the player symbol set. In further embodiments, the designated quantity of the symbols is less than the quantity of the symbols in the player symbol set. In one embodiment, the gaming system selects an additional symbol to include in the gaming system symbol set whenever the gaming system selects a symbol that is already included in the gaming system symbol set.

In one embodiment, the additional award opportunity triggering event is active (i.e., may occur) in each play of the Keno game of the present disclosure. In another embodiment, the additional award opportunity triggering event is activated when the gaming system receives a secondary wager in addition to any primary wager. That is, in this embodiment, the gaming system requires the secondary wager to be placed to enable the additional award opportunity triggering event to occur for a play of the Keno game. In a further embodiment, the additional award opportunity triggering event is active if the gaming system receives a wager that reaches or exceeds a predetermined wager threshold.

In one embodiment, the gaming system includes a single pool including the plurality of symbols and the gaming system selects the symbols from that pool, with replacement, to form the gaming system symbol set. For instance, in an example in which the symbols are numbers, if the pool of numbers includes the numbers 1 through 80 and the first number the gaming system selects from the pool to include in the gaming system number set is the number 33, the number 33 is "returned" to the pool prior to the gaming system's next selection. Thus, when the gaming system selects the next number from the pool to include in the gaming system number set, the pool includes the numbers 1 through 80 (and not the numbers 1 through 32 and 34 through 80).

In another embodiment, the gaming system includes a plurality of different pools of the same plurality of symbols and, more specifically, a quantity of different pools of the symbols at least equal to the quantity of symbols the gaming system is to include in the gaming system symbol set. In this embodiment, the gaming system forms the gaming system symbol set by selecting one symbol from each of a plurality of the different pools to include in the gaming system symbol set. For instance, in an example in which the symbols are numbers, if the gaming system number set is to include ten of the numbers 1 through 80, the gaming system selects one number from each of ten different pools of numbers, each of which includes the numbers 1 through 80.

In a further embodiment, the gaming system includes a plurality of different pools of the same plurality of symbols, wherein each of the symbols is associated with one of a plurality of different characteristics. In this embodiment, the gaming system forms the gaming system symbol set by selecting one symbol (and associated characteristic) from each of a plurality of the different pools to include in the gaming system symbol set. For instance, in an example in which the symbols are numbers, if the gaming system number set is to include ten of the numbers 1 through 80, the gaming system selects one number from each of ten different pools of numbers, each of which includes the numbers 1 through 80. In this embodiment, the characteristics associated with the numbers determine whether the additional award opportunity triggering event occurs. More specifically, the additional award opportunity triggering event occurs based on whether the gaming system symbol set includes a plurality of instances of each of one or more of the symbols associated with a same characteristic. In one example in which the symbols are numbers, the additional award opportunity triggering event occurs when the gaming system number set includes the numbers 1A, 1A, 2B, and 23 (because the gaming system number set includes two instances of the number 1 that each have the same characteristic A and two instances of the number 2 that each have the same characteristic B), while the additional award opportunity triggering event does not occur when the gaming system number set includes the numbers 1A, 1B, 2A, and 2B.

It should be appreciated that:

(a) the additional award opportunity event(s) is(are) employed;

(b) the symbols are employed;

(c) the quantity of symbols in the player symbol set;

(d) the quantity of symbols in the gaming system symbol set;

(e) the additional award opportunity;

(f) the quantity of symbols that may be selected more than once;

(g) the additional award opportunity triggering event itself;

(h) any of the quantities described herein;

(i) the paytable (e.g., the awards and the associated quantities of matches);

(j) how the gaming system selects the symbols of the gaming system symbol set; and/or (k) any other suitable variable or determination disclosed herein, may be: (1) predetermined; (2) randomly determined; (3) randomly determined based on one or more weighted percentages; (4) determined based on a generated symbol or symbol combination; (5) determined independent of a generated symbol or symbol combination: (6) determined based on a random determination by a central controller (described below); (7) determined independent of a random determination by the central controller; (8) determined based on a random determination at an electronic gaming machine (EGM) configured to operate the primary wagering game and/or any bonus game (described below); (9) determined independent of a random determination at the EGM; (10)

determined based on at least one play of at least one game; (11) determined independent of at least one play of at least one game; (12) determined based on a player's selection: (13) determined independent of a player's selection; (14) determined based on one or more side wagers placed; (15) determined independent of one or more side wagers placed; (16) determined based on the player's primary game wager; (17) determined independent of the player's primary game wager; (18) determined based on time (such as the time of day); (19) determined independent of time (such as the time of day); (20) determined based on an amount of coin-in accumulated in one or more pools; (21) determined independent of an amount of coin-in accumulated in one or more pools; (22) determined based on a status of the player (i.e., a player tracking status); (23) determined independent of a status of the player (i.e., a player tracking status); (24) determined based on one or more weighted tables; (25) determined based on one or more other determinations disclosed herein; (26) determined independent of any other determination disclosed herein; and/or (27) determined in any other suitable manner or based on or independent of any other suitable factor(s).

Gaming Systems

It should be appreciated that the above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. It should be appreciated that a "gaming system" as used herein refers to various configurations of: (a) one or more central servers, central controllers, or remote hosts; (b) one or more EGMs; and/or (c) one or more personal gaming devices, such as desktop computers, laptop computers, tablet computers or computing devices, personal digital assistants (PDAs), mobile telephones such as smart phones, and other mobile computing devices.

Thus, in various embodiments, the gaming system of the present disclosure includes: (a) one or more EGMs in combination with one or more central servers, central controllers, or remote hosts; (b) one or more personal gaming devices in combination with one or more central servers, central controllers, or remote hosts; (c) one or more personal gaming devices in combination with one or more EGMs; (d) one or more personal gaming devices, one or more EGMs, and one or more central servers, central controllers, or remote hosts in combination with one another; (e) a single EGM; (f) a plurality of EGMs in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity, each EGM and each personal gaming device of the present disclosure is collectively referred to herein as an "EGM." Additionally, for brevity and clarity, unless specifically stated otherwise, "EGM" as used herein represents one EGM or a plurality of EGMs, and "central server, central controller, or remote host" as used herein represents one central server, central controller, or remote host or a plurality of central servers, central controllers, or remote hosts.

Figure 3A:
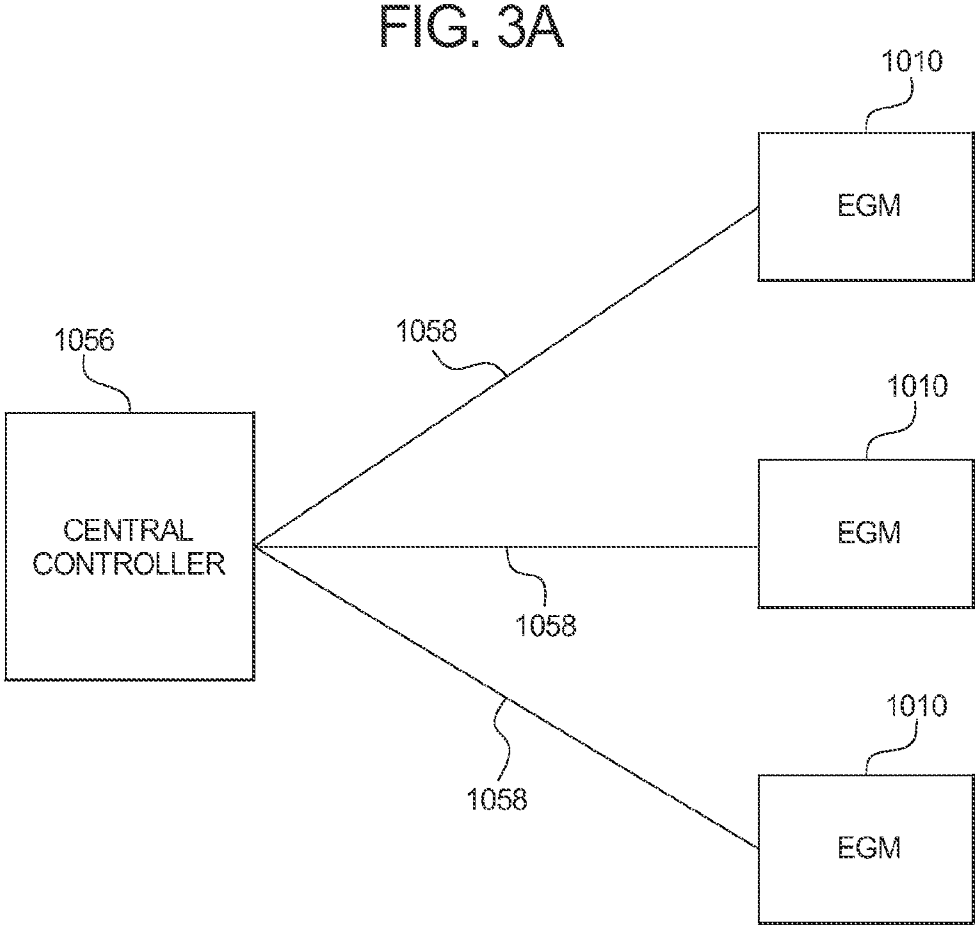
FIG. 3A is a schematic block diagram of an example network configuration of one embodiment of the gaming system of the present disclosure.

As noted above, in various embodiments, the gaming system includes an EGM in combination with a central server, central controller, or remote host. In such embodiments, the EGM is configured to communicate with the central server, central controller, or remote host through a data network or remote communication link. In certain such embodiments, the EGM is configured to communicate with another EGM through the same data network or remote communication link or through a different data network or remote communication link. For example, the gaming system illustrated in FIG. 3A includes a plurality of EGMs 1010 that are each configured to communicate with a central server, central controller, or remote host 1056 through a data network 1058.

In certain embodiments in which the gaming system includes an EGM in combination with a central server, central controller, or remote host, the central server, central controller, or remote host is any suitable computing device (such as a server) that includes at least one processor and at least one memory device or storage device. As further described below, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. It should be appreciated that one, more, or each of the functions of the central server, central controller, or remote host may be performed by the at least one processor of the EGM. It should be further appreciated that one, more, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network; and/or (b) a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: (a) an EGM configured to communicate with a central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the central server, central controller, or remote host. For example, one or more of the EGMs are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located. It should be appreciated that in certain embodiments in which the data network is a WAN, the gaming system includes a central server, central controller, or remote host and an EGM each located in a different gaming establishment in a same geographic area, such as a same city or a same state. It should be appreciated that gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central controller, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium. It should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

EGM Components

In various embodiments, an EGM includes at least one processor configured to operate with at least one memory device, at least one input device, and at least one output device. The at least one processor may be any suitable processing device or set of processing devices, such as a microprocessor, a microcontroller-based platform, a suitable integrated circuit, or one or more application-specific integrated circuits (ASICs). FIG. 33 illustrates an example EGM including a processor 1012.

Figure 3B:
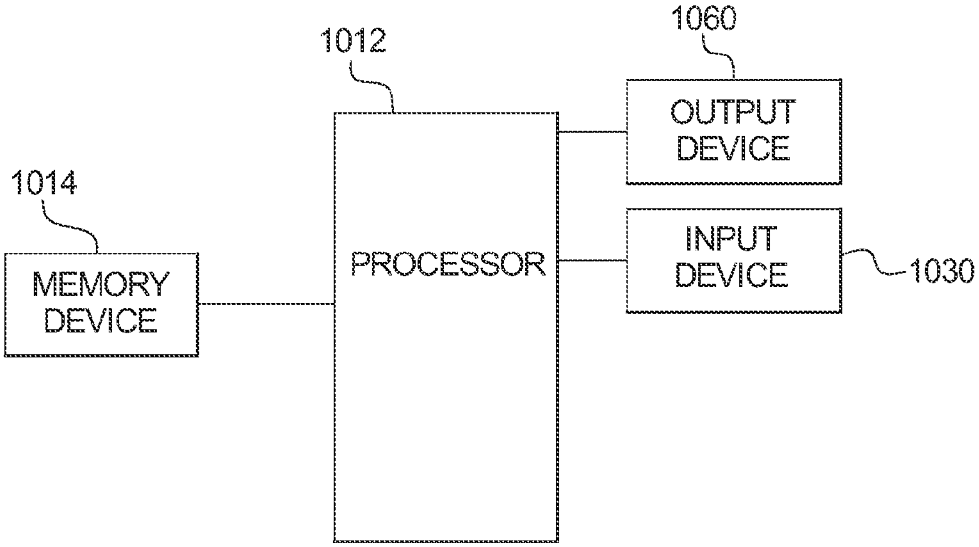
FIG. 3B is a schematic block diagram of an example electronic configuration of a gaming system of the present disclosure.

As generally noted above, the at least one processor of the EGM is configured to communicate with, configured to access, and configured to exchange signals with at least one memory device or data storage device. In various embodiments, the at least one memory device of the EGM includes random access memory (RAM), which can include non-volatile RAM (NVRAM), magnetic RAM (MRAM), ferroelectric RAM (FeRAM), and other forms as commonly understood in the gaming industry. In other embodiments, the at least one memory device includes read only memory (ROM). In certain embodiments, the at least one memory device of the EGM includes flash memory and/or EEPROM (electrically erasable programmable read only memory). The example EGM illustrated in FIG. 3B includes a memory device 1014. It should be appreciated that any other suitable magnetic, optical, and/or semiconductor memory may operate in conjunction with the EGM disclosed herein. In certain embodiments, the at least one processor of the EGM and the at least one memory device of the EGM both reside within a cabinet of the EGM (as described below). In other embodiments, at least one of the at least one processor of the EGM and the at least one memory device of the EGM reside outside the cabinet of the EGM (as described below).

In certain embodiments, as generally described above, the at least one memory device of the EGM stores program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM (such as primary or base games and/or secondary or bonus games as described below). In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an internet or intranet).

Figure 4A:
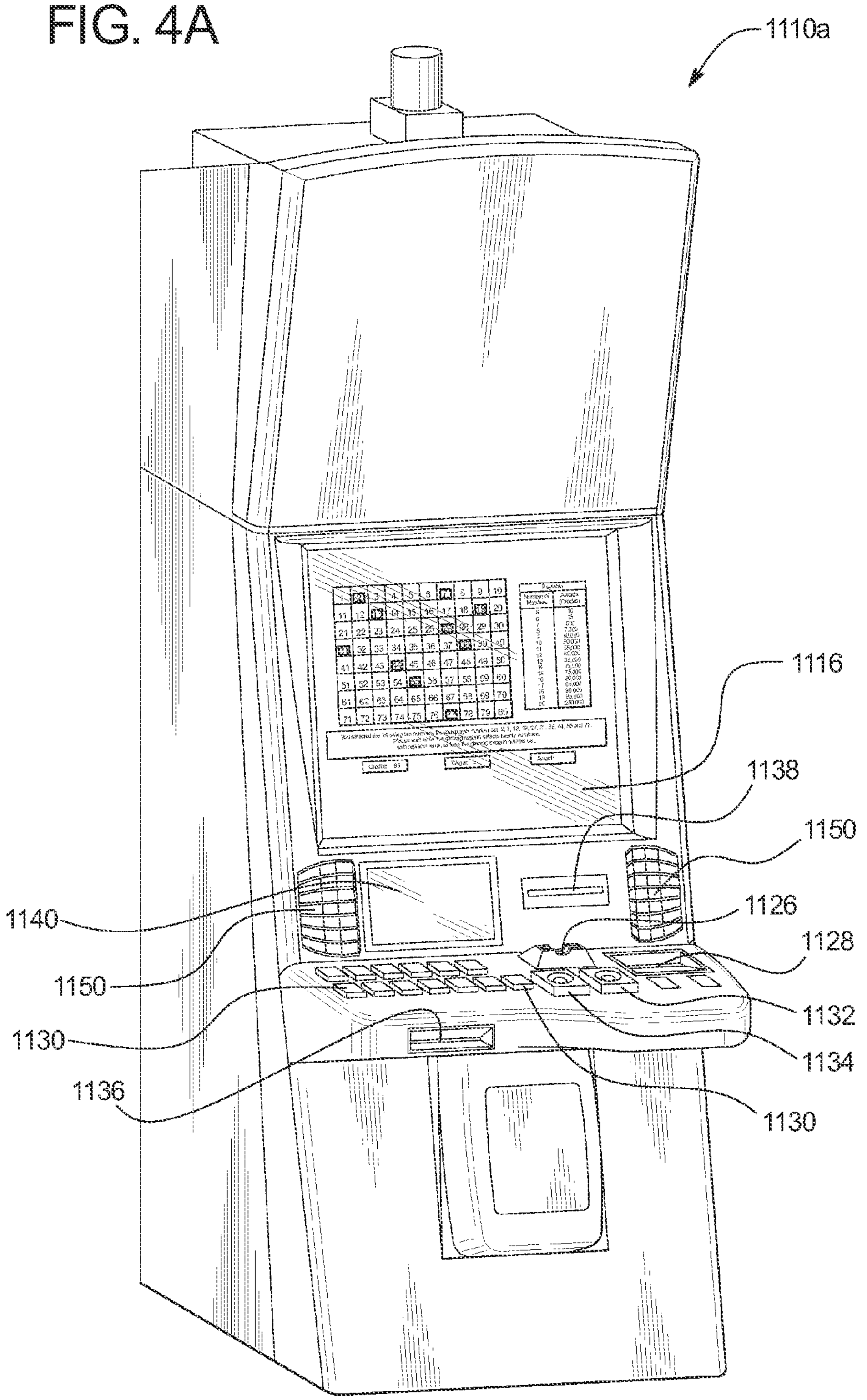
FIGS. 4A and 4B are perspective views of example alternative embodiments of gaming systems of the present disclosure.
Figure 4B:
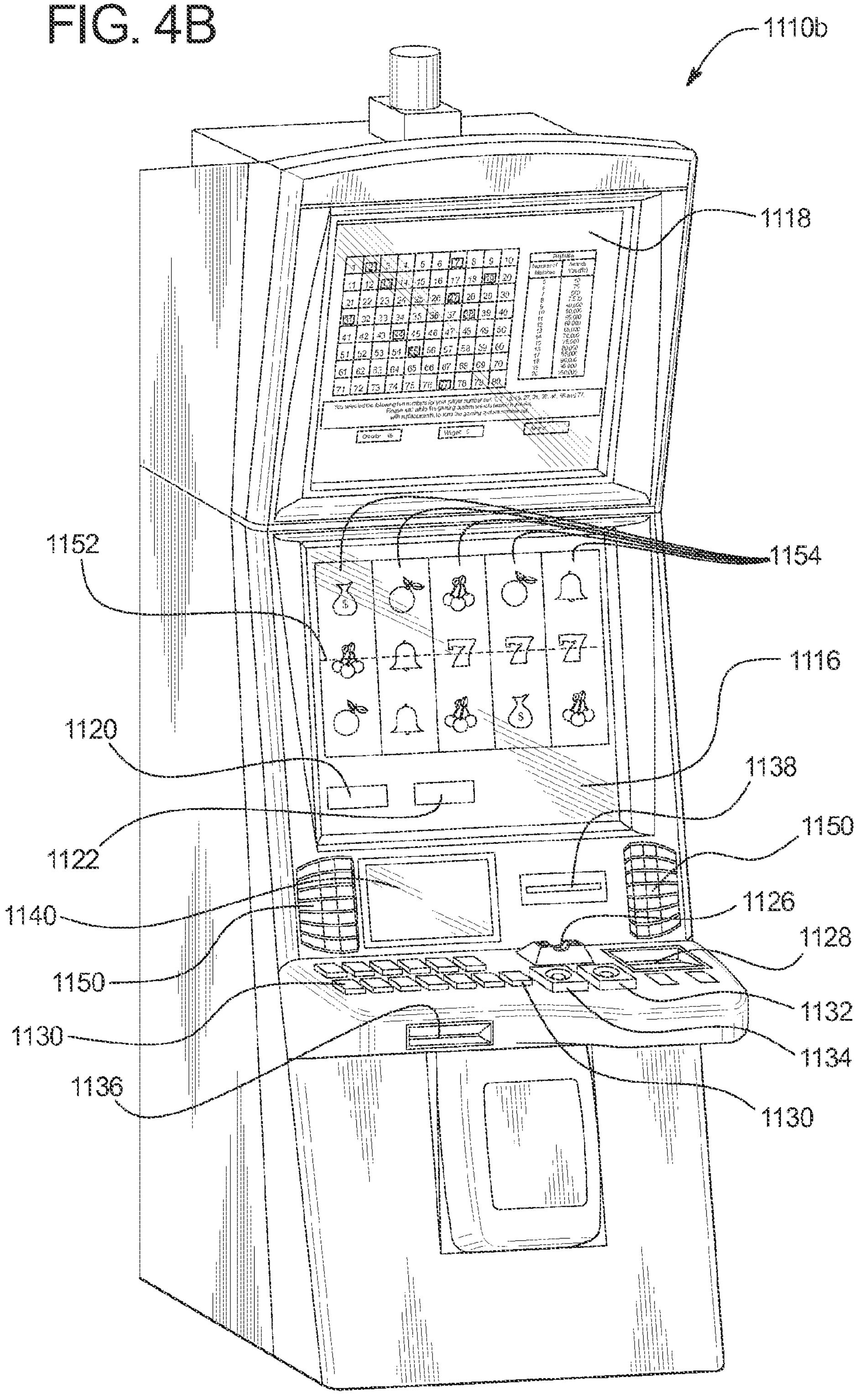

In various embodiments, the EGM includes one or more input devices. The input devices may include any suitable device that enables an input Signal to be produced and received by the at least one processor of the EGM. The example EGM illustrated in FIG. 3B includes at least one input device 1030. One input device of the EGM is a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. FIGS. 4A and 4B illustrate example EGMs 1110*a* and 1110*b* that each include the following payment devices: (a) a combined bill and ticket acceptor 1128, and (b) a coin slot 1126.

In one embodiment, the EGM includes a payment device configured to enable the EGM to be funded via an electronic funds transfer, such as a transfer of funds from a bank account. In another embodiment, the EGM includes a payment device configured to communicate with a mobile device of a player, such as a cell phone, a radio frequency identification tag, or any other suitable wired or wireless device, to retrieve relevant information associated with that player to fund the EGM. It should be appreciated that when the EGM is funded, the at least one processor determines the amount of funds entered and displays the corresponding amount on a credit display or any other suitable display as described below.

In various embodiments, one or more input devices of the EGM are one or more game play activation devices that are each used to initiate a play of a game on the EGM or a sequence of events associated with the EGM following appropriate funding of the EGM. The example EGMs 1110*a* and 1110*b* illustrated in FIGS. 4A and 4B each include a game play activation device in the form of a game play initiation button 1132. It should be appreciated that, in other embodiments, the EGM begins game play automatically upon appropriate funding rather than upon utilization of the game play activation device.

In certain embodiments, one or more input devices of the EGM are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one. The example EGMs 1110*a* and 1110*b* illustrated in FIGS. 4A and 4B each include one or more input devices 1130.

In other embodiments, one input device of the EGM is a cash out device. The cash out device is utilized to receive a cash payment or any other suitable form of payment corresponding to a quantity of remaining credits of a credit display (as described below). The example EGMs 1110*a* and 1110*b* illustrated in FIGS. 4A and 4B each include a cash out device in the form of a cash out button 1134.

In certain embodiments, one input device of the EGM is a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In various embodiments, one input device of the EGM is a sensor, such as a camera, in communication with the at least one processor of the EGM (and controlled by the at least one processor of the EGM in some embodiments) and configured to acquire an image or a video of a player using the EGM and/or an image or a video of an area surrounding the EGM.

In embodiments including a player tracking system, as further described below, one input device of the EGM is a card reader in communication with the at least one processor of the EGM. The example EGMs 1110*a* and 1110*b* illustrated in FIGS. 4A and 4B each include a card reader 1138. The card reader is configured to read a player identification card inserted into the card reader.

In various embodiments, the EGM includes one or more output devices. The example EGM illustrated in FIG. 3B includes at least one output device 1060. One or more output devices of the EGM are one or more display devices configured to display any game(s) displayed by the EGM and any suitable information associated with such game(s). In certain embodiments, the display devices are connected to or mounted on a cabinet of the EGM (as described below). In various embodiments, the display devices serves as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM 1110*a* illustrated in FIG. 4A includes a central display device 1116, a player tracking display 1140, a credit display 1120, and a bet display 1122. The example EGM 1110*b* illustrated in FIG. 4B includes a central display device 1116, an upper display device 1118, a player tracking display 1140, a credit display 1120, and a bet display 1122.

In various embodiments, the display devices include, without imitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. It should be appreciated that the display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, one output device of the EGM is a payout device. In these embodiments, when the cash out device is utilized as described above, the payout device causes a payout to be provided to the player. In one embodiment, the payout device is one or more of: (a) a ticket generator configured to generate and provide a ticket or credit slip representing a payout, wherein the ticket or credit slip may be redeemed via a cashier, a kiosk, or other suitable redemption system; (b) a note generator configured to provide paper currency; (c) a coin generator configured to provide coins or tokens in a coin payout tray; and (d) any suitable combination thereof. The example EGMs 1110*a* and 1110*b* illustrated in FIGS. 4A and 4B each include ticket generator 1136. In one embodiment, the EGM includes a payout device configured to fund an electronically recordable identification card or smart card or a bank account via an electronic funds transfer.

In certain embodiments, one output device of the EGM is a sound generating device controlled by one or more sound cards. In one such embodiment, the sound generating device includes one or more speakers or other sound generating hardware and/or software for generating sounds, such as by playing music for any games or by playing music for other modes of the EGM, such as an attract mode. The example EGMs 1110*a* and 1110*b* illustrated in FIGS. 4A and 4B each include a plurality of speakers 1150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. At least U.S. Patent Application Publication No. 2004/0254014 describes a variety of EGMs including one or more communication ports that enable the EGMs to communicate and operate with one or more external peripherals.

As generally described above, in certain embodiments, such as the example EGMs 1110*a* and 1110*b* illustrated in FIGS. 4A and 4B, the EGM has a support structure, housing, or cabinet that provides support for a plurality of the input device and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs 1110*a* and 1110*b* shown in FIGS. 4A and 4B, EGMs may have varying cabinet and display configurations.

It should be appreciated that, in certain embodiments, the EGM is a device that has obtained approval from a regulatory gaming commission, and in other embodiments, the EGM is a device that has not obtained approval from a regulatory gaming commission.

As explained above, for brevity and clarity, both the EGMs and the personal gaming devices of the present disclosure are collectively referred to herein as "EGMs." Accordingly, it should be appreciated that certain of the example EGMs described above include certain elements that may not be included in all EGMs. For example, the payment device of a personal gaming device such as a mobile telephone may not include a coin acceptor, while in certain instances the payment device of an EGM located in a gaming establishment may include a coin acceptor.

Operation of Primary or Base Games and/or Secondary or Bonus Games

In various embodiments, an EGM may be implemented in one of a variety of different configurations. In various embodiments, the EGM may be implemented as one of: (a) a dedicated EGM wherein computerized game programs executable by the EGM for controlling any primary or base games (referred to herein as "primary games") and/or any secondary or bonus games or other functions (referred to herein as "secondary games") displayed by the EGM are provided with the EGM prior to delivery to a gaming establishment or prior to being provided to a player; and (b) a changeable EGM wherein computerized game programs executable by the EGM for controlling any primary games and/or secondary games displayed by the EGM are downloadable to the EGM through a data network or remote communication link after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. At least U.S. Pat. Nos. 7,470,183; 7,563,163; and 7,833,092 and U.S. Patent Application Publication Nos. 2005/0148382, 2006/0094509, and 2009/0181743 describe various examples of this type of award determination.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least hi part, on the selected elements on the provided bingo cards. At least U.S. Pat. Nos. 7,753,774; 7,731,581; 7,955,170; and 8,070,579 and U.S. Patent Application Publication No. 2011/0028201 describe various examples of this type of award determination.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database for storing player profiles, (b) a player tracking module for tracking players (as described below), and (c) a credit system for providing automated transactions. At least U.S. Pat. No. 6,913,534 and U.S. Patent Application Publication No. 2006/0281541 describe various examples of such accounting systems.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGM 1110*b* shown in FIG. 4B includes a payline 1152 and a plurality of reels 1154. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. At least U.S. Pat. No. 8,012,011 and U.S. Patent Application Publication Nos. 2008/0108408 and 2008/0132320 describe various examples of ways to win award determinations.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. At least U.S. Pat. Nos. 5,766,079; 7,585,223; 7,651,392; 7,666,093; 7,780,523; and 7,905,778 and U.S. Patent Application Publication Nos. 2008/0020846, 2009/0123364, 2009/0123363, and 2010/0227677 describe various examples of different progressive gaming systems.

As generally noted above, in addition to providing winning credits or other awards for one or more plays of the primary game(s), in various embodiments the gaming system provides credits or other awards for one or more plays of one or more secondary games. The secondary game typically enables a prize or payout in to be obtained addition to any prize or payout obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). It should be appreciated that the secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. It should be appreciated that any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for the providing of the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. At least U.S. Patent Application Publication Nos. 2007/0123341, 2008/0070680, 2008/0176650, and 2009/0124363 describe various examples of different group gaming systems.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaining system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. At least U.S. Pat. Nos. 6,722,985; 6,908,387; 7,311,605; 7,611,411; 7,617,151; and 8,057,298 describe various examples of player tracking systems.

It should be understood that various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

at least one processor;

at least one display device;

at least one input device; and at least one memory device storing a plurality of instructions which, when executed by the at least one processor, cause the at least one processor to operate with the at least one display device and the at least one input device, for a play of a game, to:

(a) display a plurality of different symbols;

(b) receive a selection from a player of at least one of the plurality of different symbols to form a player symbol set;

(c) randomly select a designated quantity of the plurality of different symbols to form a gaming system symbol set, wherein each of one or more of the plurality of different symbols can be selected more than once;

(d) determine any awards based on a comparison of the player symbol set with the gaming system symbol set;

(e) provide any determined awards to the player; and (f) upon an occurrence of an additional award opportunity triggering event, said additional award opportunity triggering event associated with the gaming system symbol set including a plurality of instances of a same one of the plurality of different symbols, provide the player with an additional award opportunity.

2. The gaming system of claim 1, wherein the additional award opportunity triggering event occurs when the gaming system symbol set includes a plurality of instances of each of at least a designated quantity of the plurality of different symbols.

3. The gaming system of claim 1, wherein the additional award opportunity triggering event occurs when the gaming system symbol set includes at least a designated quantity of instances of each of at least one of the plurality of different symbols.

4. The gaming system of claim 1, wherein the additional award opportunity includes an additional play of the game associated with a second plurality of different symbols.

5. The gaming system of claim 4, wherein the plurality of instructions, when executed by the at least one processor, cause the at least one processor to operate with the at least one input device to enable the player to select a quantity of the second plurality of different symbols to form a second player symbol set for use in the additional play of the game, the quantity of the second plurality of different symbols being equal to a quantity of the plurality of different symbols included more than once in the gaming system symbol set.

6. The gaming system of claim 4, wherein the plurality of instructions, when executed by the at least one processor, cause the at least one processor to operate with the at least one input device to enable the player to select a quantity of the second plurality of different symbols to form a second player symbol set for use in the additional play of the game, the quantity of the second plurality of different symbols being equal to a total quantity of instances of the plurality of different symbols included more than once in the gaming system symbol set.

7. A method of operating a gaming system, said method comprising:

for a play of a game:

(a) causing at least one processor to execute a plurality of instructions stored in at least one memory device to operate with at least one display device to display a plurality of different symbols;

(b) causing the at least one processor to execute the plurality of instructions to operate with at least one display device to receive a selection from a player of at least one of the plurality of different symbols to form a player symbol set;

(c) causing the at least one processor to execute the plurality of instructions to randomly select a designated quantity of the plurality of different symbols to form a gaming system symbol set, wherein each of one or more of the plurality of different symbols can be selected more than once;

(d) causing the at least one processor to execute the plurality of instructions to determine any awards based on a comparison of the player symbol set with the gaming system symbol set;

(e) providing any determined awards to the player; and (f) upon an occurrence of an additional award opportunity triggering event, said additional award opportunity triggering event associated with the gaming system symbol set including a plurality of instances of a same one of the plurality of different symbols, providing the player with an additional award opportunity.

8. The method of claim 7, wherein the additional award opportunity triggering event occurs when the gaming system symbol set includes a plurality of instances of each of at least a designated quantity of the plurality of different symbols.

9. The method of claim 7, wherein the additional award opportunity triggering event occurs when the gaming system symbol set includes at least a designated quantity of instances of each of at least one of the plurality of different symbols.

10. The method of claim 7, wherein the additional award opportunity includes an additional play of the game associated with a second plurality of different symbols.

11. The method of claim 10, which includes enabling the player to select a quantity of the second plurality of different symbols to form a second player symbol set for use in the additional play of the game, the quantity of the second plurality of different symbols being equal to a quantity of the plurality of different symbols included more than once in the gaming system symbol set.

12. The method of claim 10, which includes enabling the player to select a quantity of the second plurality of different symbols to form a second player symbol set for use in the additional play of the game, the quantity of the second plurality of different symbols being equal to a total quantity of instances of the plurality of different symbols included more than once in the gaming system symbol set.

13. The method of claim 7, which is provided through a data network.

14. The method of claim 13, wherein the data network is an internet.

15. A non-transitory computer readable medium storing a plurality of instructions which, when executed by at least one processor, cause the at least one processor to:

for a play of a game:

(a) cause at least one display device to display a plurality of different symbols;

(b) operate with at least one input device to receive a selection from a player of at least one of the plurality of different symbols to form a player symbol set;

(c) randomly select a designated quantity of the plurality of different symbols to form a gaming system symbol set, wherein each of one or more of the plurality of different symbols can be selected more than once;

(d) determine any awards based on a comparison of the player symbol set with the gaming system symbol set;

(e) provide any determined awards to the player; and (f) upon an occurrence of an additional award opportunity triggering event, said additional award opportunity triggering event associated with the gaming system symbol set including a plurality of instances of a same one of the plurality of different symbols, provide the player with an additional award opportunity.

16. The non-transitory computer readable medium of claim 15, wherein the additional award opportunity triggering event occurs when the gaming system symbol set includes a plurality of instances of each of at least a designated quantity of the plurality of different symbols.

17. The non-transitory computer readable medium of claim 15, wherein the additional award opportunity triggering event occurs when the gaming system symbol set includes at least a designated quantity of instances of each of at least one of the plurality of different symbols.

18. The non-transitory computer readable medium of claim 15, wherein the additional award opportunity includes an additional play of the game associated with a second plurality of different symbols.

19. The non-transitory computer readable medium of claim 18, wherein the plurality of instructions, when executed by the at least one processor, cause the at least one processor to operate with the at least one input device to enable the player to select a quantity of the second plurality of different symbols to form a second player symbol set for use in the additional play of the game, the quantity of the second plurality of different symbols being equal to a quantity of the plurality of different symbols included more than once in the gaming system symbol set.

20. The non-transitory computer readable medium of claim 18, wherein the plurality of instructions, when executed by the at least one processor, cause the at least one processor to operate with the at least one input device to enable the player to select a quantity of the second plurality of different symbols to form a second player symbol set for use in the additional play of the game, the quantity of the second plurality of different symbols being equal to a total quantity of instances of the plurality of different symbols included more than once in the gaming system symbol set.

* * * * *